US010474819B2

(12) United States Patent
Vasilenko et al.

(10) Patent No.: US 10,474,819 B2
(45) Date of Patent: Nov. 12, 2019

(54) METHODS AND SYSTEMS FOR MAINTAINING A SANDBOX FOR USE IN MALWARE DETECTION

(71) Applicant: Lastline, Inc., Santa Barbara, CA (US)

(72) Inventors: Roman Vasilenko, Montecito, CA (US); Clemens Kolbitsch, Goleta, CA (US)

(73) Assignee: Lastline, Inc., Santa Barbara, CA (US)

( * ) Notice: Subject to any disclaimer, the term of this patent is extended or adjusted under 35 U.S.C. 154(b) by 28 days.

(21) Appl. No.: 14/947,390

(22) Filed: Nov. 20, 2015

(65) Prior Publication Data

US 2017/0147819 A1 May 25, 2017

(51) Int. Cl.
G06F 21/00 (2013.01)
G06F 21/56 (2013.01)
G06F 21/53 (2013.01)
G06F 21/57 (2013.01)
G06F 11/36 (2006.01)
G06F 11/00 (2006.01)
G06F 21/55 (2013.01)

(52) U.S. Cl.
CPC .......... G06F 21/566 (2013.01); G06F 11/004 (2013.01); G06F 11/3664 (2013.01); G06F 21/53 (2013.01); G06F 21/554 (2013.01); G06F 21/577 (2013.01)

(58) Field of Classification Search
CPC .................................................. G06F 21/566
USPC ........................................................ 726/23
See application file for complete search history.

(56) References Cited

U.S. PATENT DOCUMENTS

| 5,488,716 | A | 1/1996 | Schneider et al. |
| 8,479,286 | B2* | 7/2013 | Dalcher .............. G06F 11/3466 726/22 |
| 8,990,944 | B1* | 3/2015 | Singh ..................... G06F 21/56 726/24 |

(Continued)

OTHER PUBLICATIONS

Chen et al., "When Virtual Is Better Than Real", The Eighth IEEE Workshop on Hot Topics in Operating Systems, May 20-23, 2001, 7 pages.

(Continued)

*Primary Examiner* — Alexander Lagor
*Assistant Examiner* — Syed M Ahsan
(74) *Attorney, Agent, or Firm* — Foley and Lardner LLP

(57) ABSTRACT

A shadow sandbox is maintained for malware detection. The shadow sandbox is a virtual machine replica of a target computing environment from a protected computing system. The shadow sandbox is maintained through all change events that occur to the target computing environment. The described systems and methods of detecting or preventing malware execution include maintaining a virtual machine replica of a target computing system by monitoring the target computing system for a plurality of possible events, the plurality of possible events including change events and risk events, detecting a change event on the target computing system, and updating the virtual machine based on the detected change event. The described systems and methods detect a risk event on the target computing system, execute the risk event on the virtual machine, and determine whether the risk event is malicious based on observation of execution of the risk event on the virtual machine.

20 Claims, 5 Drawing Sheets

(56) References Cited

U.S. PATENT DOCUMENTS

| | | |
|---|---|---|
| 9,043,913 B2 | 5/2015 | Gribble et al. |
| 2008/0016339 A1 | 1/2008 | Shukla |
| 2010/0107252 A1 | 4/2010 | Mertoguno |
| 2012/0084445 A1* | 4/2012 | Brock .................. G06F 9/5077 709/226 |
| 2012/0173913 A1 | 7/2012 | Xu et al. |
| 2015/0096025 A1* | 4/2015 | Ismael .................. G06F 21/566 726/23 |
| 2015/0150006 A1 | 5/2015 | Fitzgerald et al. |
| 2015/0205962 A1* | 7/2015 | Swidowski ........... G06F 21/566 726/23 |

OTHER PUBLICATIONS

Price, "The Paradox of Security in Virtual Environments", IEEE Computer Society, 0018-9162/08, 2008, pp. 22-28.

Willems et al., "Toward Automated Dynamic Malware Analysis Using CWSandbox", IEEE Computer Society,1540-7993/07, 2007, pp. 32-39.

\* cited by examiner

METHODS AND SYSTEMS FOR MAINTAINING A SANDBOX FOR USE IN MALWARE DETECTION

BACKGROUND

The present application relates generally to the field of computer security. In general, a computing device may have one or more vulnerabilities that can be leveraged by malicious code to compromise the computing device. In addition, malicious code might be introduced onto a computing device by deceiving the user. Computer security is improved through the detection of malicious software ("malware") that uses malicious code to exploit vulnerabilities or deceives the user in order to repurpose infected computers. Once malware is detected, the deceptive behavior is identified, and/or the exploits are understood, security systems may be designed to recognize and block the malware and the vulnerabilities may be patched.

SUMMARY

A shadow sandbox is maintained for malware detection. The shadow sandbox is a virtual machine replica of a computing environment for a protected computing system. The shadow sandbox is maintained through all change events that occur to the computing environment and protected computing system. The described systems and methods of detecting or preventing malware execution include maintaining the virtual machine replica by monitoring the protected computing system for a plurality of possible events, the plurality of possible events including change events and risk events, detecting a change event on the protected computing system, and updating the virtual machine replica based on the detected change event. The described systems and methods detect a risk event on the protected computing system, execute the risk event on the virtual machine replica, and determine whether the risk event is malicious based on observation of execution of the risk event on the virtual machine replica.

In one aspect, the disclosure relates to a method for detecting or preventing malware execution. The method comprises maintaining a virtual machine replica of a target computing system by monitoring the target computing system for a plurality of possible events, the plurality of possible events including change events and risk events, detecting a change event on the target computing system, and updating the virtual machine based on the detected change event. The method includes detecting a risk event on the target computing system and executing the risk event on the virtual machine. The method further includes determining whether the risk event is malicious based on observation of execution of the risk event on the virtual machine.

In some implementations, the method further comprises blocking execution of the risk event on the target computing system while evaluating the risk event on the virtual machine. In some implementations, the method includes blocking execution of the risk event on the target computing system responsive to a determination that the risk event is malicious. In some implementations of the method, the virtual machine is maintained in an inactive state and updating the virtual machine with the detected change event includes transitioning the virtual machine from the inactive state to an active state, executing the change event on the virtual machine in the active state, and transitioning the virtual machine from the active state back to the inactive state subsequent to executing the change event.

In some implementations, the target computing system is one of a plurality of computing systems each satisfying a profile. In some implementations, the method includes monitoring a second computing system in the plurality of computing systems, the second computing system satisfying the profile, and detecting a second risk event on the second computing system. The method includes executing the second risk event on the virtual machine responsive to detecting the second risk event and determining whether the second risk event is malicious based on observation of execution of the second risk event on the virtual machine. In some implementations, the method includes detecting a second change event on the target computing system satisfying the profile and, responsive to detecting the second change event on the target computing system determining that the target computing system will not satisfy the first profile after execution of the second change event. The method includes creating a duplicate of the virtual machine, associating one of the virtual machine and the duplicate of the virtual machine with the first profile, and associating the other of the virtual machine and the duplicate of the virtual machine with a second profile. The method then includes updating the other of the virtual machine and the duplicate of the virtual machine, associated with the second profile.

In one aspect, the disclosure relates to a system that includes computer memory storing a virtual machine replica of a target computing system, one or more hypervisors configured to execute the virtual machine, and one or more computing processors configured to maintain the virtual machine replica of the target computing system by monitoring the target computing system for a plurality of possible events, the plurality of possible events including change events and risk events, detecting a change event on the target computing system, and updating the virtual machine with the detected change event. The processors are further configured to detect a risk event on the target computing system, cause at least one of the one or more hypervisors to execute the risk event on the virtual machine, and determine whether the risk event is malicious based on observation of execution of the risk event on the virtual machine.

In one aspect, the disclosure relates to a computer-readable media storing instructions that, when executed by a computer processor, cause the computer processor to maintain a virtual machine replica of a target computing system by monitoring the target computing system for a plurality of possible events, the plurality of possible events including change events and risk events, detecting a change event on the target computing system, and updating the virtual machine based on the detected change event. The instructions further cause the computer processor to detect a risk event on the target computing system, execute the detected risk event on the virtual machine, and determine whether the risk event is malicious based on observation of execution of the risk event on the virtual machine.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
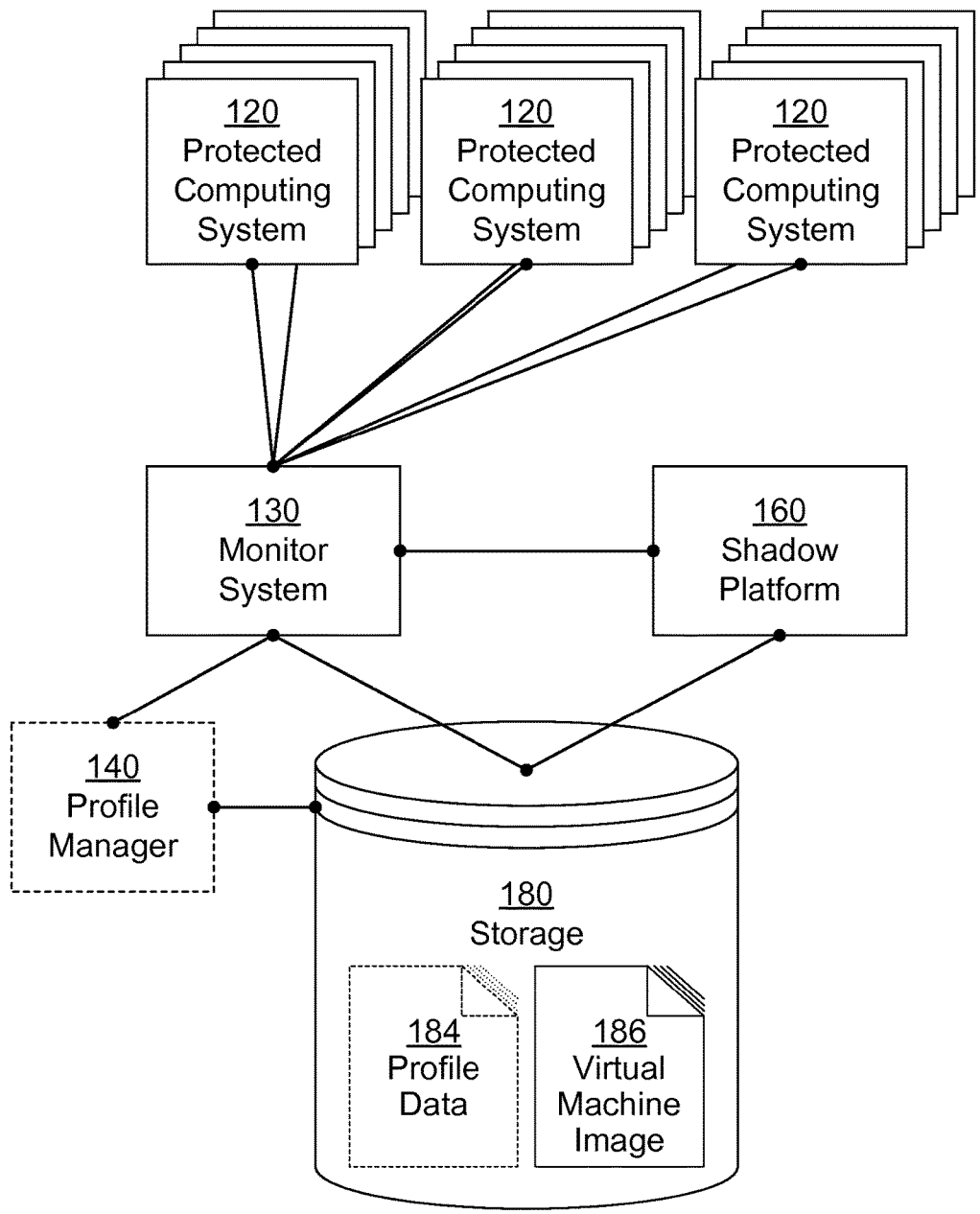
FIG. 1 is a block diagram of elements in an example system for maintaining a sandbox for use in malware detection.

Following below are more detailed descriptions of various concepts related to, and implementations of, methods, apparatuses, and systems introduced above. The various concepts introduced above and discussed in greater detail below may be implemented in any of numerous ways, as the concepts described are not limited to any particular manner of implementation. Examples of specific implementations and applications are provided primarily for illustrative purposes.

In general, a computing device may have one or more vulnerabilities that can be leveraged to compromise the computing device. Vulnerabilities include unintentional program flaws such as a buffer with inadequate overrun prevention, and intentional holes such as an undisclosed programmatic backdoor. Malicious code can, and has been, developed to exercise these various vulnerabilities to yield the execution of code chosen by, and possibly controlled by, an attacker. Malicious code implemented to target a particular vulnerability may be referred to as an exploit. For example, malicious code may codify, as an exploit, accessing an apparently benign interface and causing a buffer overflow that results in placement of unauthorized code into the execution stack where it may be run with elevated privileges. An attack could execute such an exploit and enable an unauthorized party to extract data from the computing device or obtain administrative control over the computing device. In some instances, the exploit code downloads additional components of the malware and modifies the operating system to become persistent. The computing device, now compromised, may be used for further attacks on other computing devices in a network or put to other malicious purposes.

Computing devices may also be compromised by deceiving a user into installing malicious software. For example, the malicious software may be packaged in a way that is appealing to the user or in a way that makes it similar to another known benign program (e.g., a program to display a video). A user may be deceived into installing malicious software without the user understanding what he or she has done.

Malicious code may be embodied in malicious software ("malware"). As used herein, malware includes, but is not limited to, computer viruses, worms, Trojans, rootkits, adware, and spyware. Malware may generally include any software that circumvents user or administrative controls. Malicious code may be created by an individual for a particular use. Generally, because malicious activity can happen in many forms, it is desirable to recognize previously unknown malicious code.

In some instances, malware may be designed to avoid detection. For example, malware may be designed to load into memory before malware detection software starts during a boot-up phase. Malware may be designed to integrate into an operating system present on an infected machine. Malware may bury network communication in apparently benign network communication. Malware may connect to legitimate network endpoints to obscure connections to control servers or other targets. In some instances, malware behaves in an apparently benign manner until a trigger event, e.g., a set day arrives. In some instances, malware is reactive to environmental conditions. For example, malware may be designed to behave in an apparently benign manner in the presence of malware detection software. Some instances of malware are designed to target specific computing devices, e.g., to only attack specific computing hardware or computing environments that have select properties. This type of malware might not exhibit any malicious behavior until it is installed on a target computing device that has the select properties. As a result, it may be difficult to detect the existence or presence of such malware on computing devices that lack the select properties.

FIG. 1 is a block diagram of elements in an example system for maintaining a sandbox for use in malware detection. Depicted in FIG. 1 are protected computing systems 120, a monitor system 130, a profile manager 140, a shadow platform 160, and a storage 180 for storing profile data 184 and virtual machine images 186. In brief overview, the protected computing systems 120 are any computing system that may become infected with malware. The monitor system 130 monitors computing activity on the protected computing systems 120. The monitor system 130 maintains virtual machine replicas of the protected computing systems 120. The maintained virtual machine replicas execute on a shadow platform 160 and are stored as virtual machine images 186 in a storage 180. In some implementations, a profile manager 140 maintains profile data 184 associating protected computing systems 120 with virtual machine images 186.

Figure 4:
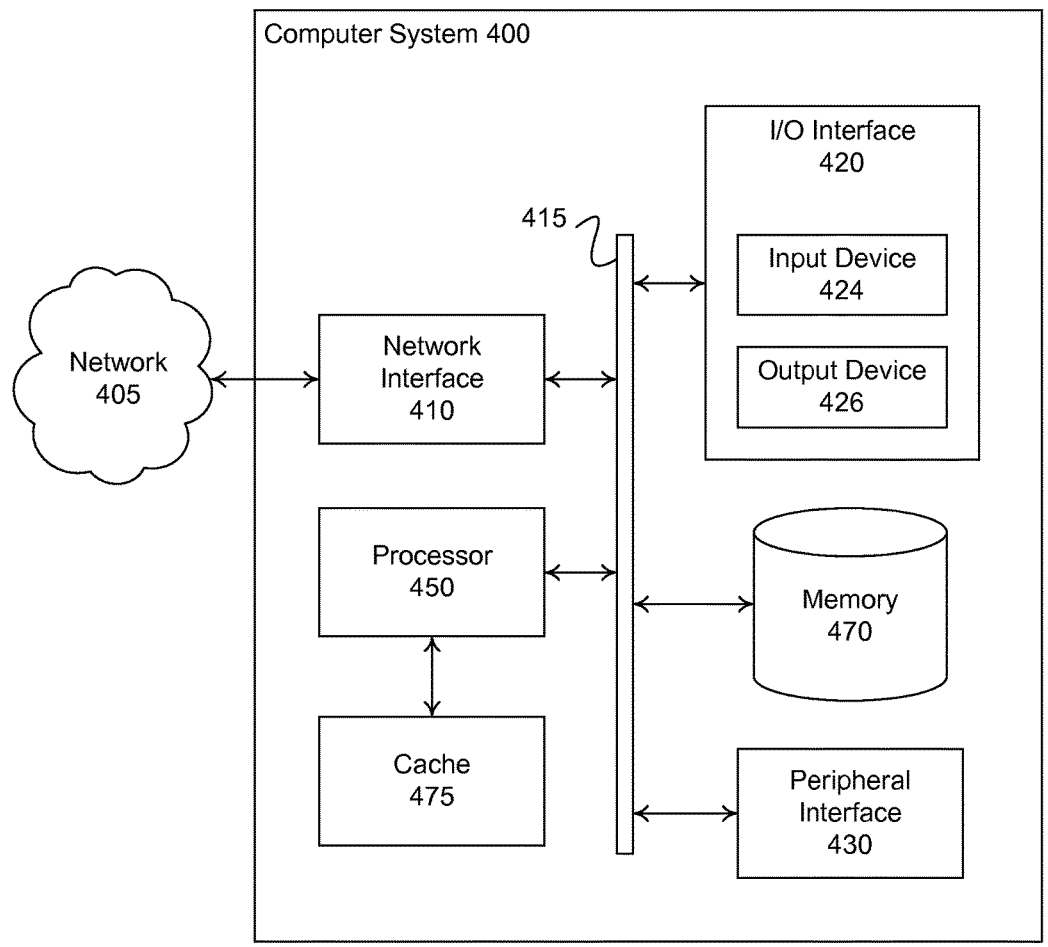
FIG. 4 is a block diagram depicting one implementation of a general architecture of a computing device useful in connection with the methods and systems described herein.

Referring to FIG. 1 in more detail, the protected computing systems 120 are any computing system that may become infected with malware. FIG. 4, described below, depicts an example computer system 400 that may be used, in some implementations, as a protected computing system 120. Examples of protected computing systems 120 include, but are not limited to, desktop computers, laptop computers, tablet computers, touch screen computers, thin clients, and mobile phones such as "smart" phones. In some implementations, protected computing systems 120 are computing environments executed as virtual machines. In some implementations, the protected computing systems 120 can include devices that incorporate dedicated computer controllers are examples of protected computing systems 120, including, e.g., cameras, scanners, and printers (two or three dimensional), as well as automobiles, flying drones, robotic vacuum cleaners, and so forth.

The monitor system 130 monitors computing activity on the protected computing systems 120. In some implementations, the monitor system 130 is a server connected to, or in communication with, the protected computing systems 120. For example, the monitor system 130 may be connected to, or in communication with, the protected computing systems 120 via a network such as a local area network (LAN) or wide area network (WAN). In some implementations, the network is a virtual private network (VPN) operated over a third-party or public network. In some implementations, the monitor system 130 may be connected to, or in communication with, the protected computing systems 120 via a dedicated link such as a serial or universal serial bus (USB) connection. FIG. 4, described below, depicts an example computer system 400 that may be used, in some implementations, as a monitor system 130. In some implementations, the monitor system 130 is incorporated into the protected computing system 120. In some implementations, the monitor system 130 is a set of circuits packaged into a portable device connected directly to the protected computing system 120 through a peripheral port such as a USB port. The packaged circuits may further include storage 180.

FIG. 1 depicts a large number of computing systems monitored by a single monitor system 130. However, in some implementations, the monitor system 130 monitors only a single protected computing system 120, in a one-to-one relationship. In some implementations, a pool of multiple monitor systems 130 are responsible for monitoring multiple protected computing systems 120. The exact ratio of protected computing systems 120 to monitor systems 130 may be one-to-one, many-to-one, or many-to-many.

Figure 5:
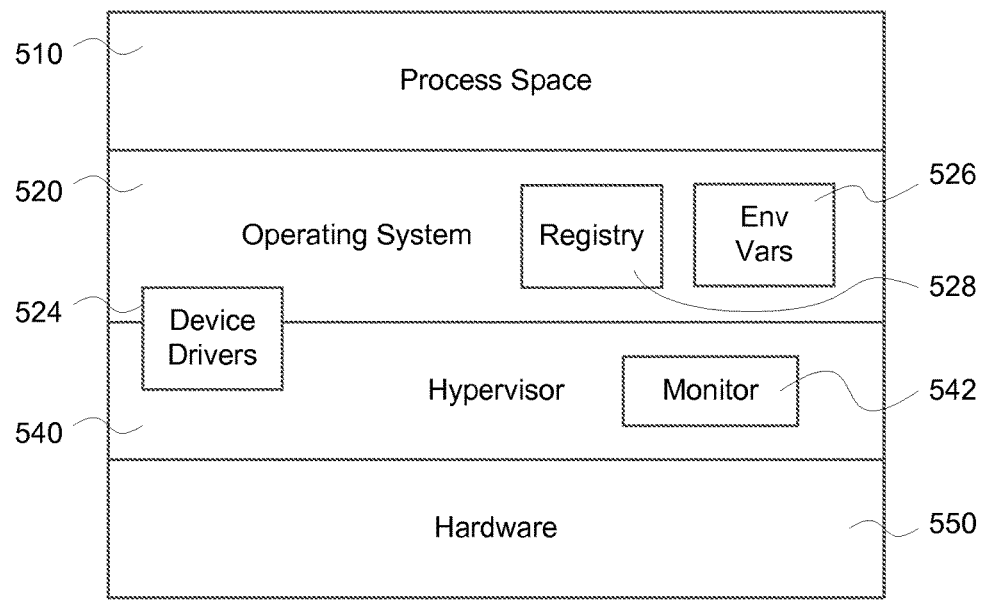
FIG. 5 is a block diagram depicting an implementation of an execution space for monitoring a computer program.

In some implementations, the monitor system 130 relies on hardware located in, or software executing on, the protected computing systems 120 to assist with the monitoring. For example, in some implementations, each protected computing system 120 includes a library of hooking functions that intercept one or more library calls and notify the monitor system 130 of each intercepted call. In some implementations, the protected computing system 120 is a virtual machine running on a hypervisor. In some such implementations, the hypervisor is configured to notify the monitor system 130 of calls to one or more specific library or operating system functions. In some implementations, the hypervisor includes or hosts the monitor system 130. In some implementation, the monitor system 130 is external to the hypervisor and uses virtual machine introspection ("VMI") techniques to remotely monitor the protected computing systems 120. FIG. 5, described below, is a block diagram depicting one example implementation of an execution space for monitoring a computer program.

The monitor system 130 maintains virtual machine replicas of the protected computing systems 120. The maintained virtual machine replicas execute on a shadow platform 160 and are stored as virtual machine images 186 in a storage 180. Each virtual machine replica is maintained based on a protected computing system 120. In some implementations, the monitor system 130 keeps each virtual machine replica ready in a "hot standby" or "sleep" mode where it is loaded on the shadow platform 160 and ready to "wake" and execute computer code as needed. In some implementations, the monitor system 130 stores each virtual machine replica as a virtual machine image 186 recorded to storage 180. Each virtual machine image 186 may be loaded from storage 180 and executed on the shadow platform 160 as needed. In some implementations, the monitor system 130 keeps one or more virtual machine images 186 for each protected computing system 120.

Each virtual machine image 186 includes sufficient data to construct a virtual machine replica of a protected computing system 120. In some implementations, a virtual machine image 186 is a memory snapshot of a virtual machine in stand-by or "sleep" mode. In some implementations, a virtual machine image 186 is a data set that includes a disk image. In some such implementations, the data set includes information descriptive of hardware on the protected computing system 120. For example, the data set may include hardware descriptors for one or more of make and model of a computing processor, make and model of a math co-processor, make and model of a memory device, make and model of a graphics or video adaptor, make and model of a motherboard chipset, and source and version number of a basic input/output system (BIOS). In some implementations, the data set may include additional helpful information such as modification dates, utility descriptions, and miscellaneous configuration information. In some implementations, a virtual machine image 186 may be stored in a compressed and/or encrypted form.

In some implementations, monitor system 130 maintains virtual machine replicas with images of a protected computing system in a stable state. A computing system can enter such a stable state, for example, by recording the memory state of its processors, cache, and other volatile memory, in one or more memory image files written to stable (non-volatile) memory such as a magnetic disk hard drive, solid-state drive, or other data storage device. Some computer operating systems offer a "hibernation" mode that writes the memory state to stable storage for quick resumption of a computing environment, e.g., for use on a laptop computer, rather than requiring users to engage in a full system reboot. In some implementations, the stable state information includes an index or catalog of the installed computer hardware and configuration. An operating system "hibernation" mode might to this so that it can prevent errors from occurring should the resumption occur on different hardware, or with a different configuration. Some operating systems may use names other than "hibernation" for the same functionality. In some implementations, in order to maintain a virtual machine replica, the monitor system 130 causes a computing system to enter a native "hibernation" mode and then captures a snapshot of the computing system's hibernation data and persistent memory. In some implementations, the monitor system 130 records the snapshot as a delta file, storing only any differences between the current snapshot and a previous snapshot. The monitor system 130 can then establish a virtual machine emulating the computer hardware and configuration of the protected computing system based on the recorded data and copy the hibernation data and persistent memory to the established virtual machine. The monitor system 130 then causes the virtual machine to reboot or "wake" from the hibernation state, resulting in an operational virtual machine replica of the protected computing system. In some implementations, the monitor system 130 maintains or updates the virtual machine replica with a change event by restoring the virtual machine in this manner, applying the change event to the operational virtual machine replica, and then capturing or taking a snapshot of the updated operational virtual machine replica. The monitor system 130 stores the recorded snapshot in computer storage 180 for future use.

In some implementations, a profile manager 140 associates each protected computing system 120 with a profile. In some implementations, the profile manager 140 is incorporated into the monitor system 130. In some implementations, the profile manager 140 is a server connected to, or in communication with, the monitor system 130. For example, the profile manager 140 may be connected to, or in communication with, the monitor system 130 via a network such as a local area network (LAN) or wide area network (WAN). In some implementations, the network is a virtual private network (VPN) operated over a third-party or public network. In some implementations, the profile manager 140 may be connected to, or in communication with, the monitor system 130 via a dedicated link. FIG. 4, described below, depicts an example computer system 400 that may be used, in some implementations, as a profile manager 140.

The profile manager 140 manages the profiles to identify protected computing systems 120 that are similar or substantially identical. For example, in some implementations, two protected computing systems 120 are substantially identical if their respective hardware is the same make and model, their respective operating system is the same version, and their respectively installed software was installed in the same order from the same source versions. In some implementations, two protected computing systems 120 are substantially identical if their respective virtual machine images 186 are identical or are identical other than unique identifiers assigned to each. The profile manager 140 may identify multiple protected computing systems 120 that satisfy a profile and the monitor system 130 keeps one or more virtual machine images 186 for each identified profile. As a result, the monitor system 130 avoids storing redundant virtual machine images 186, reducing the number of virtual machine images 186 stored by the monitor system 130.

The profile manager 140 stores profile data 184 that associates each protected computing device 120 with a corresponding profile. The profile data 184 associates each profile with corresponding virtual machine images 186. A computing device 120 satisfying a particular profile may then be associated with the corresponding virtual machine images 186 for that particular profile. If the profile manager 140 determines that a particular protected computing system 120 no longer satisfies the profile with which it was associated, the profile data 184 is updated to associate the particular protected computing system 120 with a different, possibly new, profile and corresponding virtual machine image 186. In some implementations, the profile manager 140 stores the profile data 184 in the storage 180. In some implementations, the profile manager 140 stores the profile data 184 in a storage device not shown.

The monitor system 130 maintains virtual machine replicas of the protected computing systems 120 for execution on a shadow platform 160. The shadow platform 160 is a computing device configured to host one or more virtual machines and facilitate analysis of the hosted virtual machines for detection of malware and malicious code. In some implementations, the shadow platform 160 includes a hypervisor. In some implementations, the monitor system 130 loads a virtual machine image 186 from the storage 180 to the shadow platform 160 for execution and analysis. FIG. 5, described below, is a block diagram depicting one example implementation of an execution space for monitoring a computer program suitable for use as a shadow platform 160.

The monitor system 130 maintains virtual machine images 186 in a storage 180, which is a computer-accessible data storage system. Data storage systems suitable for use as storage 180 include volatile or non-volatile storage devices such as semiconductor memory devices, magnetic disk-based devices, and optical disc-based devices. A data storage device may incorporate one or more mass storage devices. Data storage devices may be accessed via an intermediary server and/or via a data network. In some implementations, the storage 180 is a network attached storage (NAS) system. In some implementations, the storage 180 is a storage area network (SAN). In some implementations, the storage 180 is geographically distributed. Data storage devices may be virtualized and/or cloud-based. In some implementations, the storage 180 is a database server. In some implementations, the storage 180 stores data in a file system as a collection of files or blocks of data. Data stored in the storage 180 may be encrypted. In some implementations, access to the storage 180 is restricted by one or more authentication systems.

Figure 2:
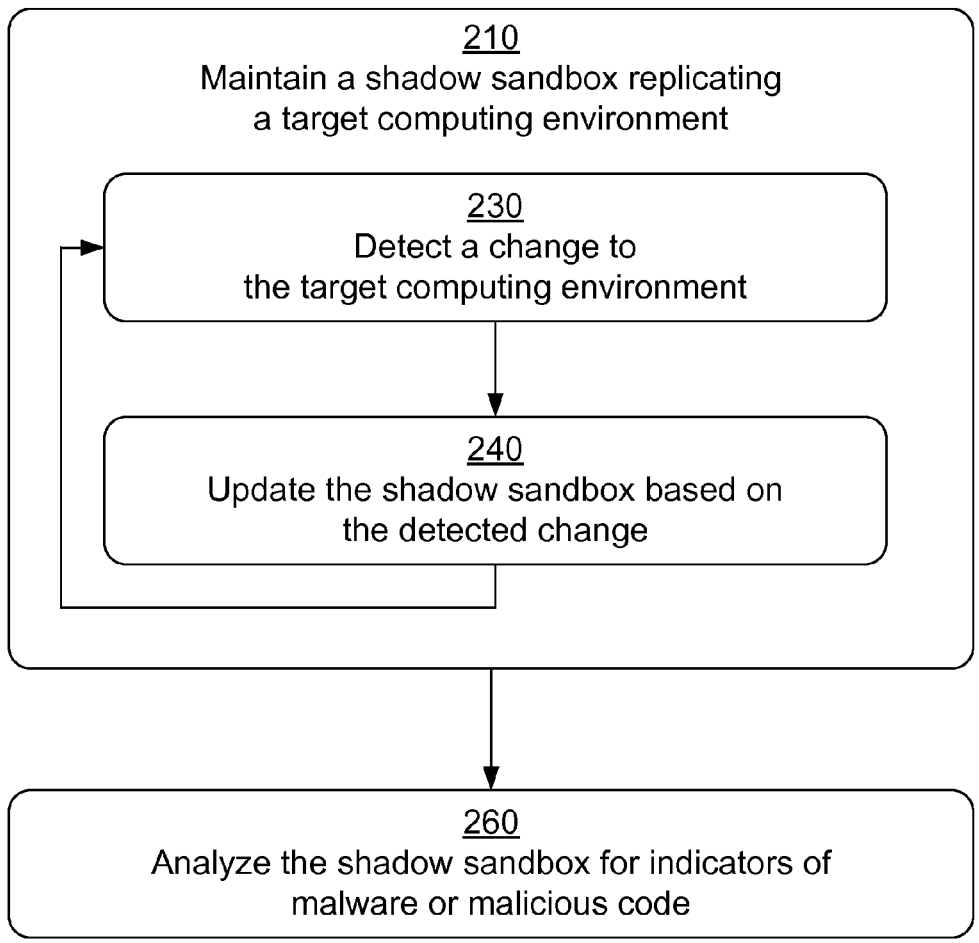
FIG. 2 is a flowchart for an example method of maintaining a sandbox for use in malware detection.
Figure 3:
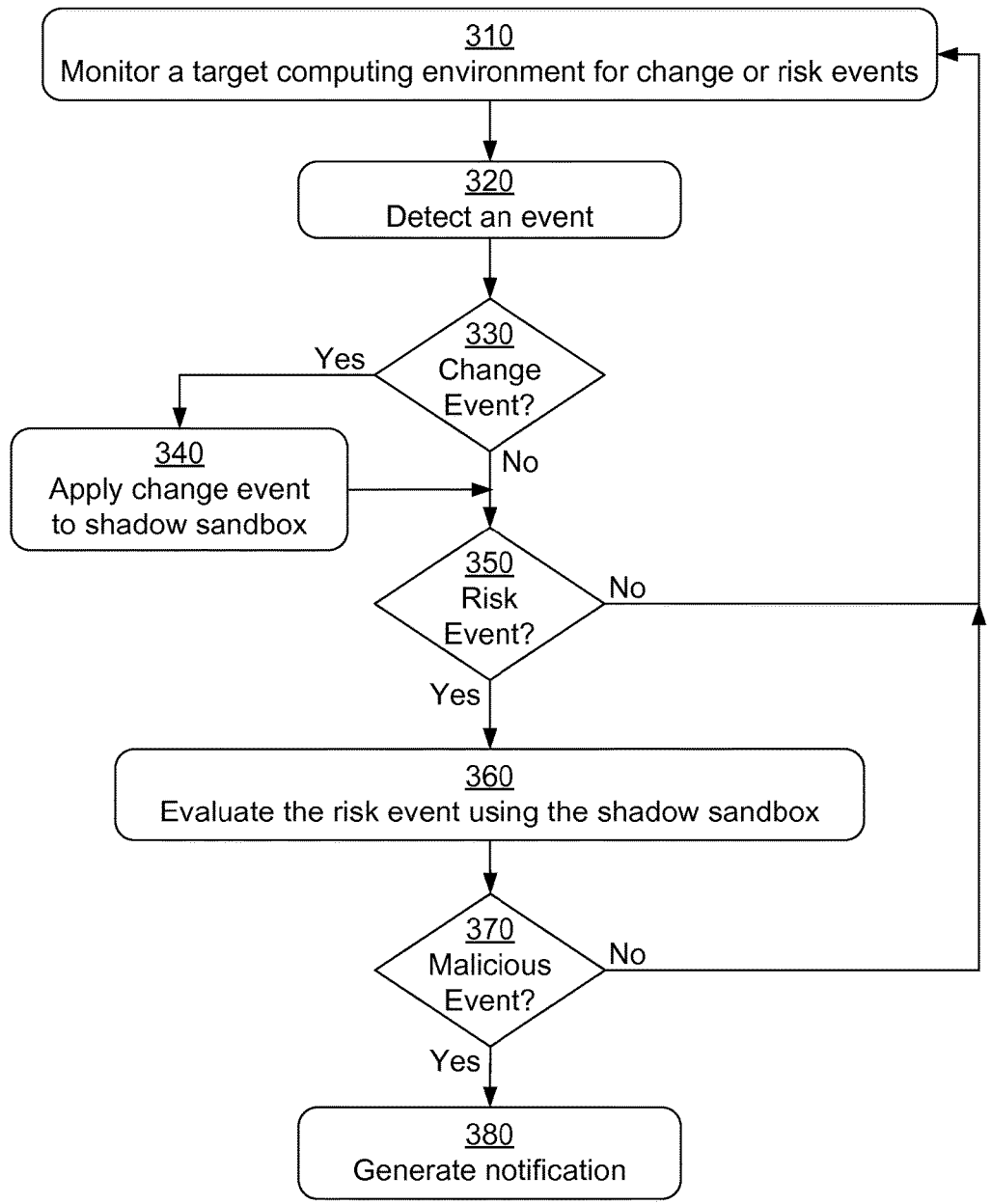
FIG. 3 is a flowchart for an example method of detecting change and risk events and applying the detected events to a shadow sandbox for use in malware detection

FIG. 2 is a flowchart for an example method of maintaining a shadow sandbox for use in malware detection. The shadow sandbox is a virtual machine replica of the target computing environment and protected computing system 120. Each protected computing system 120 provides one or more computing environments that each include, for example, an installed and configured operating system, environment settings, installed software applications, installed device drivers, and so forth. In broad overview, at stage 210, a monitor system 130 maintains the shadow sandbox replicating a target computing environment by detecting, at stage 230, a change in the target computing environment and updating, at stage 240, the shadow sandbox based on the detected change. At stage 260, the monitor system 130, or another malware analysis tool, analyzes the shadow sandbox for indicators of malware or malicious code. FIG. 3, described below, is a flowchart for an example method of detecting change and risk events and applying the detected events to a shadow sandbox for use in malware detection.

Referring to FIG. 2 in more detail, at stage 210, a monitor system 130 maintains the shadow sandbox replicating a target computing environment by detecting, at stage 230, a change in the target computing environment and updating, at stage 240, the shadow sandbox based on the detected change. In some implementations, the shadow sandbox is a virtualized computing system maintained in parallel to a protected computing system 120, e.g., using a shadow platform 160. The shadow sandbox can then be modified, examined, and manipulated in manners that may not be possible with the protected computing system 120. The added access can facilitate detection of malware and infectious malicious code.

At stage 230, the monitor system 130 detects a change in the target computing environment. In some implementations, the monitor system 130 detects changes using a hooking mechanism. In some implementations, the monitor system 130 detects changes by monitoring a disk driver. In some implementations, the monitor system 130 detects changes by monitoring a virtualized environment. In some implementations, the monitor system 130 detects changes by using other user-mode or kernel mode techniques to intercept event calls. In some implementations, the monitor system 130 relies on reports from the protected computing system 120 notifying the monitor system 130 of changes in the target computing environment.

At stage 240, the monitor system 130 updates the shadow sandbox based on the changes detected at stage 230. In some implementations, the monitor system 130 replicates the change in the shadow sandbox. For example, if a software application is installed in the target computing environment, then the monitor system 130 installs the same software application in the shadow sandbox. Likewise, if registry setting is modified in the target computing environment, then the monitor system 130 modifies the same registry setting in the shadow sandbox.

At stage 260, the monitor system 130, or another malware analysis tool, analyzes the shadow sandbox for indicators of malware or malicious code. For example, the monitor system 130 may evaluate the risk associated with a change based on observation of the shadow sandbox after execution of the change.

In some implementations, the monitor system 130 takes actions, described in more detail below in reference to FIG. 3, based particular events detected within target computing environments on protected computing systems 120. Some actions are specific to change events, or to risk events. A change event is an event that changes the protected computing system 120 or a computing environment hosted by a protected computing system 120. A risk event is an event that poses a risk to the protected computing system 120 or the computing environment hosted by the protected computing system 120. Risk events are potentially associated with malicious activity or malware. Table 1, below, is a non-limiting table of examples of events and how they are classified in some implementations.

change or risk events. Some examples of detectable events are indicated in Table 1, above. In some implementations, the monitor system 130 detects events using a hooking mechanism. In some implementations, the monitor system 130 detects events by monitoring a disk driver. In some implementations, the monitor system 130 detects events by monitoring a virtualized environment. In some implementations, the monitor system 130 detects events by using other user-mode or kernel mode techniques to intercept event calls. In some implementations, the monitor system 130 relies on reports from the protected computing system 120 notifying the monitor system 130 of events in the target computing environment.

TABLE 1

| Description of an Event | Change Event | Risk Event |
|---|---|---|
| Modification to a Basic Input/Output System (BIOS) | ✓ | ✓ |
| Modification to an operating system file, including an operating system library file or configuration file | ✓ | ✓ |
| Modification to an operating system registry | ✓ | ✓ |
| Modification to a device driver | ✓ | ✓ |
| Installation or modification of a software application | ✓ | ✓ |
| Installation of a pre-approved software application | ✓ | |
| Creation or modification of a data file by a software application, where the data file has a file-type specific to the software application | | |
| Creation or modification of a data file by a software application, where the data file does not have a file-type specific to the software application | | ✓ |
| Creation or modification of a data file in a temporary folder or directory, including cache files, browser cookie files, and memory paging files | | |
| Access to a data file by a software application, where the data file was not created by the software application | | ✓ |
| Network communication with an end host that is either unrecognized or is on a list of untrusted hosts | | ✓ |
| Execution of a program within a pre-existing process | | ✓ |
| Injection of a library or thread into a pre-existing process or from one process into another process | | ✓ |

FIG. 3 is a flowchart for an example method of detecting change and risk events and applying the detected events to a shadow sandbox for use in malware detection. The shadow sandbox is a virtual machine replica of the target computing environment and protected computing system 120. In broad overview, at stage 310, a monitor system 130 monitors a target computing environment for change or risk events. At stage 320, the monitor system 130 detects an event and at stage 330 the monitor system 130 determines whether the detected event is a change event requiring an update to the shadow sandbox for the target computing environment. If the event is a change event, then at stage 340 the monitor system 130 applies the change event to the shadow sandbox. At stage 350, the monitor system 130 determines whether the event is a risk event requiring analysis of the event in the shadow sandbox. If the event is a risk event, the monitor system 130 evaluates the risk event at stage 360 using the shadow sandbox. At stage 370, the monitor system 130 determines whether the risk event is malicious, and, if so, the monitor system 130 then generates a notification at stage 380. If the event is not a risk event, or if the risk event is not malicious, the monitor system 130 returns to stage 310 and continues monitoring the target computing environment at the protected computing system 120. In some implementations, a separate malware analysis tool evaluates the risk event at stages 360, 370, and 380. However, for ease of discussion, the example method is presented as though the monitor system 130 includes the analysis tools.

Referring to FIG. 3 in more detail, at stage 310, a monitor system 130 monitors a target computing environment for At stage 320, the monitor system 130 detects an event. In some implementations, the monitor system 130 detects particular events such as modifications to an operating system, modifications to an operating system configuration or registry, modifications to protected libraries, modifications to a set of monitored files, installation of software, and modifications to installed software. In some implementations a software installer installs software applications from software installation packages. For example, some software may be installed using an MSI file. In some implementations, the monitor system 130 detects execution of an MSI file. In some implementations, the monitor system 130 detects any modification to data stored in a file system and determines if the modification constitutes a change event for the target computing environment. For example, in some implementations, if an installed software application writes data to a file with a file-type specific to the installed software application, the monitor system 130 may determine that the modification to the file is not a change event; whereas if the installed software application writes data to a file with a more general-purpose file-type, or to a file with a file-type associated with some other software application, the monitor system 130 may determine that the modification to the file is a change event and, possibly, a risk event. In some implementations, the monitor system 130 ignores data written to particular directories such as temporary file directories, software application specific data directories, cache directories, memory page files, and the like.

In some implementations, the target computing environment is blocked from performing the event detected at stage 320 until after the monitor system 130 has updated the shadow sandbox and evaluated any risks posed by the event. In some implementations, the target computing environment is allowed to perform the event detected at stage 320 and the monitor system 130 updates the shadow sandbox and evaluates the risks in parallel. In such implementations, if the event is subsequently found to result in the target computing environment becoming infected with malware or malicious code, the protected computing system 120 may be flagged by the monitor system 130 as infected. In some implementations, an infected computing system is isolated from communicating with other protected computing systems 120. In some implementations, an infected computing system is blocked from all network communications.

At stage 330, the monitor system 130 determines whether the detected event is a change event requiring an update to the shadow sandbox for the target computing environment. If the event is a change event, then at stage 340 the monitor system 130 applies the change event to the shadow sandbox. In some implementations, the monitor system 130 updates the virtual machine image by running the virtual machine on a shadow platform 160, executing the change event on the running virtual machine, effectively modifying the virtual machine based on the change event, and preserving the modified virtual machine. In some implementations, the virtual machine is running on the shadow platform 160 prior to the modification in a stand-by or "sleep" state and the monitor system 130 resumes operation of the virtual machine in order to update the virtual machine. In some implementations, the virtual machine is saved as a virtual machine image 186 in storage 180 and the monitor system 130 copies the virtual machine image 186 to the shadow platform 160 for execution. The monitor system 130 then replaces the virtual machine image 186 with an image of the updated virtual machine.

In some implementations, the monitor system 130 updates the virtual machine image in stage 340 immediately after, or close to immediately after (e.g., within a few seconds), detecting the change event at stage 320. Such contemporaneous updates result in a shadow sandbox that is as up-to-date as feasible. In some implementations, the change event detected in stage 320 is logged and queued for updating the virtual machine image in stage 340 at a later time. For example, in some implementations, the update may be queued for a short time, e.g., a few minutes to an hour or so, such that a series of changes may be batched together into a single update session. In some such implementations, changes are queued until the monitor system 130 determines that a predetermined threshold amount of time has passed without a change event detected. Then, after the predetermined threshold amount of time (e.g., ten minutes) has elapsed without a change, the queued changes are applied to the virtual machine image. In some implementations, queued change events are written to a log included in, or associated with, the virtual machine image 186 stored in storage 180.

In some implementations, target computing environments on protected computing systems 120 are associated with corresponding profiles by a profile manager 140. In some such implementations, a change event detected at stage 320 on a target computing environment associated with a profile will cause the target computing environment to differ from other computing environments associated with the profile. The profile manager 140 associates the modified target computing environment with an alternative profile that the environment satisfies as a result of the modification. If no alternative profile is available, the profile manager 140 associates the modified target computing environment with a new profile. The profile manager 140 updates the profile data 184 to associate the target computing environment with the alternative or new profile. In some implementations, if the target computing environment is the only environment associated with the profile, then the profile manager 140 modifies the profile. In some implementations, when a number of targeted computing environments satisfying a first profile are updated at or around the same time, the first such computing environment to be updated causes the profile manager 140 to a create a new second profile, and updates to the remaining such computing environments cause the profile manager 140 to associate the remaining such systems with the second profile. When the last target computing environment of the group associated with the first profile is transitioned to the second profile, the first profile may be discarded. In some implementations, the monitor system 130 recognizes that an update to a target computing environment will cause the profile manager 140 to associate the target computing environment with an existing profile. For example, the change events detected in stage 320 may be a known set of change events for transitioning from a first profile to a second profile. In some such implementations, upon recognizing that the change events result in a computing environment satisfying a known profile, the monitor system 130 can skip stage 340 and simply have the profile manager 140 update the profile data 184 for the target computing environment.

At stage 350, the monitor system 130 determines whether the event is a risk event requiring analysis of the event in the shadow sandbox. If the event is a risk event, the monitor system 130 evaluates the risk event using the shadow sandbox. In some implementations, all change events are also risk events. In some implementations, only some change events are risk events, and some risk events are not necessarily change events. See, for example, the change and risk events indicated in Table 1, above. For example, in some implementations, receiving data from a network link may be a risk event even if it is not a change event, whereas installing a software application may be a change event but not a risk event because the software application may have been previously screened and determined to be free of malicious code or malware. In some implementations, the monitor system 130 maintains a list of software applications known to be safe for installation. In some such implementations, the list of software includes signatures for validating the authenticity of software applications, e.g., hash values derived from installation executables. When software on the list is installed, the monitor system 130 compares the installation to the list, validating or verifying the authenticity of the software, and determines at stage 350 that the installation is not a risk event. However, installation of such software may still be a change event as determined at stage 330. Similarly, in some implementations, data files loaded and processed by an installed software application may be screened. The monitor system 130 may detect that a software application is accessing a data file that has not been pre-screened and determine at stage 350 that the access is a risk event, whereas access to a pre-screened data file might not be a risk event.

At stage 360, the monitor system 130 evaluates the risk event using the shadow sandbox. In some implementations, the monitor system 130 duplicates a virtual machine image 186 for the shadow sandbox and applies the risk event to the shadow sandbox, e.g., on the shadow platform 160. In some implementations, the virtual machine is running on the shadow platform 160 prior to the modification. For example, the virtual machine may be running in a stand-by or "sleep" state on the shadow platform 160 and the monitor system 130 resumes operation of the virtual machine in order to update and test the virtual machine. In some implementations, the virtual machine is saved as a virtual machine image 186 in storage 180 and the monitor system 130 copies the virtual machine image 186 to the shadow platform 160 for execution. For example, as described above, in some such implementations, a virtual machine image 186 is, or includes, a snapshot of a computing system that has been placed in a stable state, e.g., a hibernation or sleep state. To restore a virtual machine replica, the monitor uses the virtual machine image 186 data to establish a virtual machine on the shadow platform 160 with virtual hardware and configuration settings corresponding to the protected computing system. The monitor system 130 loads the stored snapshot into a virtual machine storage space of the established virtual machine on the shadow platform 160 and brings the virtual machine into an operational state. For example, in some implementations, the monitor system 130 uses an operating system's native "wake" mechanism to resume the virtual machine replica from a captured hibernation state. The virtual machine replica is then operational on the shadow platform 160, where the monitor system 130 can apply the risk event to the operational virtual machine replica and evaluate it for indicators of malicious code.

At stage 370, the monitor system 130 determines whether the risk event is malicious, and, if so, the monitor system 130 then generates a notification at stage 380. In some implementations, the risk event is deemed malicious if it results in the shadow sandbox becoming infected with malware or other malicious code. For example, if, after execution of the risk event, the shadow sandbox attempts to connect to a known botnet command and control host, it is possible that the risk event infected the shadow sandbox. In some implementations, the monitor system 130, or another malware analysis tool, inspects the shadow sandbox after execution of the risk event to determine if the shadow sandbox is infected. In some implementations, the shadow sandbox is manipulated to determine if it is infected, e.g., by speeding up the clock or performing activities known to trigger malware activity.

At stage 380, the monitor system 130 generates a notification if the shadow sandbox is infected. In some implementations, the target computing environment is prevented from performing or executing the risk event until the monitor system determines, at stage 370, whether the risk event is malicious. At stage 380, the monitor system generates a notification to the target computing environment that the risk event is malicious and should not be performed or executed. In some implementations, the target computing environment executes the risk event in parallel with the analysis in stage 360. Accordingly, if the shadow sandbox is infected it is likely that the target computing environment is also infected. In some implementations, an alert is sent to a system administrator notifying the administrator of the infected computing system. The alert may be sent, for example, using e-mail, Short Message Service (SMS) text, a custom communication tool, or any other suitable mode of communication.

FIG. 4 is a block diagram illustrating a general architecture of a computing system 400 useful in connection with the methods and systems described herein. The example computing system 400 includes one or more processors 450 in communication, via a bus 415, with one or more network interfaces 410 (in communication with a network 405), I/O interfaces 420 (for interacting with a user or administrator), and memory 470. The processor 450 incorporates, or is directly connected to, additional cache memory 475. In some uses, additional components are in communication with the computing system 400 via a peripheral interface 430. In some uses, such as in a server context, there is no I/O interface 420 or the I/O interface 420 is not used. In some uses, the I/O interface 420 supports an input device 424 and/or an output device 426. In some uses, the input device 424 and the output device 426 use the same hardware, for example, as in a touch screen. In some uses, the computing device 400 is stand-alone and does not interact with a network 405 and might not have a network interface 410.

In some implementations, one or more computing systems described herein are constructed to be similar to the computing system 400 of FIG. 4. For example, a user may interact with an input device 424, e.g., a keyboard, mouse, or touch screen, to access an interface, e.g., a web page, over the network 405. The interaction is received at the user's device's interface 410, and responses are output via output device 426, e.g., a display, screen, touch screen, or speakers.

The computing device 400 may communicate with one or more remote computing devices via a data network 405. The network 405 can be a local-area network (LAN), such as a company intranet, a metropolitan area network (MAN), or a wide area network (WAN), such as the Internet and the World Wide Web. The network 405 may be any type and/or form of network and may include any of a point-to-point network, a broadcast network, a wide area network, a local area network, a telecommunications network, a data communication network, a computer network, an asynchronous transfer mode (ATM) network, a synchronous optical network (SONET), a wireless network, an optical fiber network, and a wired network. In some implementations, there are multiple networks 405 between participants, for example a smart phone typically communicates with Internet servers via a wireless network connected to a private carrier network connected to the Internet. The network 405 may be public, private, or a combination of public and private networks. The topology of the network 405 may be a bus, star, ring, or any other network topology capable of the operations described herein.

In some implementations, one or more devices are constructed to be similar to the computing system 400 of FIG. 4. In some implementations, a server may be made up of multiple computer systems 400. In some implementations, a server may be a virtual server, for example, a cloud-based server accessible via the network 405. A cloud-based server may be hosted by a third-party cloud service. A server may be made up of multiple computer systems 400 sharing a location or distributed across multiple locations. The multiple computer systems 400 forming a server may communicate using the user-accessible network 405. The multiple computer systems 400 forming a server may communicate using a private network, e.g., a network distinct from a publicly-accessible network or a virtual private network within a publicly-accessible network.

The processor 450 may be any logic circuitry that processes instructions, e.g., instructions fetched from the memory 470 or cache 475. In many implementations, the processor 450 is a microprocessor unit. The processor 450 may be any processor capable of operating as described herein. The processor 450 may be a single core or multi-core processor. The processor 450 may be multiple processors.

The I/O interface 420 may support a wide variety of devices. Examples of an input device 424 include a keyboard, mouse, touch or track pad, trackball, microphone, touch screen, or drawing tablet. Example of an output device 426 include a video display, touch screen, speaker, inkjet printer, laser printer, dye-sublimation printer, or 3D printer. In some implementations, an input device 424 and/or output device 426 may function as a peripheral device connected via a peripheral interface 430.

A peripheral interface 430 supports connection of additional peripheral devices to the computing system 400. The peripheral devices may be connected physically, as in a universal serial bus (USB) device, or wirelessly, as in a Bluetooth™ device. Examples of peripherals include keyboards, pointing devices, display devices, audio devices, hubs, printers, media reading devices, storage devices, hardware accelerators, sound processors, graphics processors, antennas, signal receivers, measurement devices, and data conversion devices. In some uses, peripherals include a network interface and connect with the computing system 400 via the network 405 and the network interface 410. For example, a printing device may be a network accessible printer.

The computing system 400 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

FIG. 5 is a block diagram depicting one implementation of an execution space for monitoring a computer program. In general, a computing environment comprises hardware 550 and software executing on the hardware. A computer program is a set of instructions executed by one or more processors (e.g., processor 450). In a simplified view, the program instructions manipulate data in a process space 510 within the confines of an operating system 520. The operating system 520 generally controls the process space 510 and provides access to hardware 550, e.g., via device drivers 524. Generally, an operating system 520 may provide the process space 510 with various native resources, e.g., environmental variables 526 and/or a registry 528. In some implementations, the operating system 520 runs on a hypervisor 540, which provides a virtualized computing environment. The hypervisor 540 may run in the context of a second operating system or may run directly on the hardware 550. Generally, software executing in the process space 510 is unaware of the hypervisor 540. The hypervisor 540 may host a monitor 542 for monitoring the operating system 520 and process space 510.

The process space 510 is an abstraction for the processing space managed by the operating system 520. Generally, program code is loaded by the operating system into memory allocated for respective programs and the processing space 510 represents the aggregate allocated memory. Software typically executes in the process space 510. Malware detection software running in the process space 510 may have a limited view of the overall system, as the software is generally constrained by the operating system 520.

The operating system 520 generally controls the process space 510 and provides access to hardware 550, e.g., via device drivers 524. An operating system typically includes a kernel and additional tools facilitating operating of the computing platform. Generally, an operating system 520 may provide the process space 510 with various native resources, e.g., environmental variables 526 and/or a registry 528. Examples of operating systems include any of the operating systems from Apple, Inc. (e.g., OS X or iOS), from Microsoft, Inc. (e.g., any of the Windows® family of operating systems), from Google Inc. (e.g., Chrome or Android), or Bell Lab's UNIX and its derivatives (e.g., BSD, FreeBSD, NetBSD, Linux, Solaris, AIX, or HP/UX). Some malware may attempt to modify the operating system 520. For example, a rootkit may install a security backdoor into the operating system.

Environmental variables 526 may include, but are not limited to: a clock reporting a time and date; file system roots and paths; version information; user identification information; device status information (e.g., display active or inactive or mouse active or inactive); an event queue (e.g., graphic user interface events); and uptime. In some implementations, an operating system 520 may provide context information to a process executing in process space 510. For example, a process may be able to determine if it is running within a debugging tool.

An operating system 520 may provide a registry 528, e.g., Windows Registry. The registry may store one or more environmental variables 526. The registry may store file type association, permissions, access control information, path information, and application settings. The registry may comprise entries of key/value pairs.

In some implementations, the operating system 520 runs on a hypervisor 540, which provides a virtualized computing environment. The hypervisor 540, also referred to as a virtual machine monitor ("VMM"), creates one or more virtual environments by allocating access by each virtual environment to underlying resources, e.g., the underlying devices and hardware 550. Examples of a hypervisor 520 include the VMM provided by VMware, Inc., the XEN hypervisor from Xen.org, or the virtual PC hypervisor provided by Microsoft. The hypervisor 540 may run in the context of a second operating system or may run directly on the hardware 550. The hypervisor 540 may virtualize one or more hardware devices, including, but not limited to, the computing processors, available memory, and data storage space. The hypervisor can create a controlled computing environment for use as a testbed or sandbox. Generally, software executing in the process space 510 is unaware of the hypervisor 540.

The hypervisor 540 may host a monitor 542 for monitoring the operating system 520 and process space 510. The monitor 542 can detect changes to the operating system 520. The monitor 542 can modify memory virtualized by the hypervisor 540. The monitor 542 can be used to detect malicious behavior in the process space 510. In some implementation, the monitor 542 is external to the hypervisor 540 and uses virtual machine introspection ("VMI") techniques to remotely monitor the operating system 520 and process space 510. For example, in some VMI implementations, the monitor 542 inspects memory elements used by the operating system 520 and/or the process space 510. In some VMI implementations, the monitor 542 analyzes an activity log. In some VMI implementations, the monitor 542 analyzes activity in real-time.

Device drivers 524 generally provide an application programming interface ("API") for hardware devices. For example, a printer driver may provide a software interface to a physical printer. Device drivers 524 are typically installed within an operating system 520. Device drivers 524 may be modified by the presence of a hypervisor 540, e.g., where a device is virtualized by the hypervisor 540.

The hardware layer 550 may be implemented using the computing device 400 described above. The hardware layer 550 represents the physical computer resources virtualized by the hypervisor 540.

Environmental information may include files, registry keys for the registry 528, environmental variables 526, or any other variable maintained by the operating system. Environmental information may include an event handler or an event queue. For example, a Unix kQueue. Environmental information may include presence or activity of other programs installed or running on the computing machine. Environmental information may include responses from a device driver 524 or from the hardware 550 (e.g., register reads, or responses from the BIOS or other firmware).

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, C, C++, C#, Python, PROLOG, or in any byte code language such as JAVA. The software programs may be stored on or in one or more articles of manufacture as object code.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Having described certain implementations and embodiments of methods and systems, it will now become apparent to one of skill in the art that other embodiments incorporating the concepts of the disclosure may be used. Therefore, the disclosure should not be limited to certain implementations or embodiments, but rather should be limited only by the spirit and scope of the following claims.

What is claimed is:

1. A method of detecting or preventing malware execution, the method comprising:
   maintaining a virtual machine replicating a target computing system by:
      capturing a hibernation state of the target computing system,
      monitoring the target computing system for a plurality of possible events, the plurality of possible events including change events and risk events,
      detecting a change event on the target computing system and blocking the target computing system from performing the detected change event until updating the virtual machine, the detected change event comprising an approved or intentional modification to the target computing system,
      transitioning the virtual machine from an inactive state, corresponding to the captured hibernation state, to an active state,
      updating the virtual machine by applying the detected change event to the virtual machine in the active state,
      transitioning the updated virtual machine from the active state to the inactive state subsequent to executing the change event, and
      preserving the virtual machine updated with the detected change event;
   detecting a risk event on the target computing system;
   executing the risk event on the preserved virtual machine updated with the detected change event; and
   determining that the risk event is malicious based on observation of execution of the risk event on the virtual machine.

2. The method of claim 1, further comprising blocking execution of the risk event on the target computing system responsive to a determination that the risk event is malicious.

3. The method of claim 1, comprising executing the virtual machine on a hypervisor, wherein the hypervisor executes a plurality of additional virtual machines.

4. The method of claim 1, wherein the detected change event is one of:
   modification to a Basic Input/Output System (BIOS);
   modification to an operating system file;
   modification to an operating system library file;
   modification to a configuration file;
   modification to an operating system registry;
   modification to a device driver;
   installation or modification of a software application; or
   execution of a software package installer.

5. The method of claim 1, wherein the risk event is one of: a file access event, a software execution event, a device driver installation event, a library link event, an operating system configuration change event, or an operating system registry change event.

6. The method of claim 1, the method further comprising certifying an installed software package as non-malicious, wherein the detected risk event is execution of a software package that has not been certified as non-malicious.

7. The method of claim 1, the method further comprising identifying a file as untrusted, wherein the detected risk event is an access event to the untrusted file.

8. The method of claim 1, wherein the target computing system is one of a plurality of computing systems each satisfying a profile, the method further comprising:
   monitoring a second computing system in the plurality of computing systems, the second computing system satisfying the profile;
   detecting a second risk event on the second computing system;
   executing the second risk event on the virtual machine responsive to detecting the second risk event; and
   determining whether the second risk event is malicious based on observation of execution of the second risk event on the virtual machine.

9. The method of claim 1, wherein the target computing system is one of a plurality of computing systems each satisfying a first profile, the method further comprising:
   detecting a second change event on the target computing system;
   responsive to detecting the second change event on the target computing system:
      determining that the target computing system will not satisfy the first profile after execution of the second change event;
      duplicating the virtual machine to create a first virtual machine and a second virtual machine;
      associating the first virtual machine with the first profile, and associating the second virtual machine with a second profile; applying the second change event to the second virtual machine; and
      preserving the second virtual machine updated with the second change event.

10. A system for detecting or preventing malware execution, the system comprising:

computer memory storing a virtual machine replicating a target computing system;
one or more hypervisors configured to execute the virtual machine; and
one or more computing processors configured to:
  maintain the virtual machine replicating the target computing system by:
    capturing a hibernation state of the target computing system,
    monitoring the target computing system for a plurality of possible events, the plurality of possible events including change events and risk events,
    detecting a change event on the target computing system and blocking the target computing system from performing the detected change event until updating the virtual machine, the detected change event comprising an approved or intentional modification to the target computing system,
    transitioning the virtual machine from an inactive state, corresponding to the captured hibernation state, to an active state,
    update the virtual machine by applying the detected change event to the virtual machine in the active state,
    transitioning the updated virtual machine from the active state to the inactive state subsequent to executing the change event, and
    preserving the virtual machine updated with the detected change event;
  detect a risk event on the target computing system;
  cause at least one of the one or more hypervisors to execute the risk event on the preserved virtual machine updated with the detected change event; and
  determine that the risk event is malicious based on observation of execution of the risk event on the virtual machine.

11. The system of claim 10, the one or more processors further configured to block execution of the risk event on the target computing system responsive to a determination that the risk event is malicious.

12. The system of claim 10, wherein the detected change event is one of:
  modification to a Basic Input/Output System (BIOS);
  modification to an operating system file;
  modification to an operating system library file;
  modification to a configuration file;
  modification to an operating system registry;
  modification to a device driver;
  installation or modification of a software application; or
  execution of a software package installer.

13. The system of claim 10, wherein the risk event is one of: a file access event, a software execution event, a device driver installation event, a library link event, an operating system configuration change event, or an operating system registry change event.

14. The system of claim 10, the one or more processors further configured to certify an installed software package as non-malicious, wherein the detected risk event is execution of a software package that has not been certified as non-malicious.

15. The system of claim 10, wherein the target computing system is one of a plurality of computing systems each satisfying a profile, the one or more processors further configured to:
  monitor a second computing system in the plurality of computing systems, the second computing system satisfying the profile;
  detect a second risk event on the second computing system;
  execute the second risk event on the virtual machine responsive to detecting the second risk event; and
  determine whether the second risk event is malicious based on observation of execution of the second risk event on the virtual machine.

16. The system of claim 10, wherein the target computing system is one of a plurality of computing systems each satisfying a first profile, the one or more processors further configured to:
  detect a second change event on the target computing system;
  responsive to detecting the second change event on the target computing system:
    determine that the target computing system will not satisfy the first profile after execution of the second change event;
    duplicate the virtual machine to create a first virtual machine and a second virtual machine;
    associate the first virtual machine with the first profile, and associate the second virtual machine with a second profile;
    applying the second change event to the second virtual machine; and
    preserving the second virtual machine updated with the second change event.

17. A non-transitory computer-readable medium storing instructions that, when executed by one or more processors, cause the one or more processors to:
  maintain a virtual machine replicating a target computing system by:
    capturing a hibernation state of the target computing system,
    monitoring the target computing system for a plurality of possible events, the plurality of possible events including change events and risk events,
    detecting a change event on the target computing system and blocking the target computing system from performing the detected change event until updating the virtual machine, the detected change event comprising an approved or intentional modification to the target computing system,
    transitioning the virtual machine from an inactive state, corresponding to the captured hibernation state, to an active state,
    updating the virtual machine by applying the detected change event to the virtual machine in the active state,
    transitioning the updated virtual machine from the active state to the inactive state subsequent to executing the change event, and
    preserving the virtual machine updated with the detected change event;
  detect a risk event on the target computing system;
  execute the risk event on the preserved virtual machine updated with the detected change event; and
  determine that the risk event is malicious based on observation of execution of the risk event on the virtual machine.

18. The computer-readable medium of claim 17, wherein the target computing system is one of a plurality of computing systems each satisfying a profile, the media further storing instructions that, when executed by one or more processors, cause the one or more processors to:

monitor a second computing system in the plurality of computing systems, the second computing system satisfying the profile;
detect a second risk event on the second computing system;
execute the second risk event on the virtual machine responsive to detecting the second risk event; and
determine whether the second risk event is malicious based on observation of execution of the second risk event on the virtual machine.

19. The method of claim 1, further comprising executing the risk event on the preserved virtual machine updated with the detected change event in parallel with executing the risk event on the target computing system.

20. The system of claim 10, the one or more processors further configured to execute the risk event on the preserved virtual machine updated with the detected change event in parallel with executing the risk event on the target computing system.

\* \* \* \* \*